United States Patent [19]

Hunt

[11] 4,402,929
[45] Sep. 6, 1983

[54] METHOD FOR PRODUCING A HIGH DPG CARBON BLACK

[75] Inventor: Harold R. Hunt, Bartlesville, Okla.

[73] Assignee: Phillips Petroleum Company, Bartlesville, Okla.

[21] Appl. No.: 335,784

[22] Filed: Dec. 30, 1981

Related U.S. Application Data

[60] Division of Ser. No. 118,720, Feb. 5, 1980, Pat. No. 4,320,090, which is a continuation-in-part of Ser. No. 853,716, Nov. 21, 1977, abandoned.

[51] Int. Cl.³ .................. C01B 31/02; C09C 1/48
[52] U.S. Cl. .................. 423/456; 423/450; 422/150
[58] Field of Search ............ 423/450, 455, 456, 449; 422/150

[56] References Cited

U.S. PATENT DOCUMENTS

| | | | |
|---|---|---|---|
| 2,857,961 | 10/1958 | Brown et al. | 158/76 |
| 2,976,127 | 3/1961 | Latham | 23/259.5 |
| 3,250,634 | 3/1966 | Kraus et al. | 106/307 |
| 3,256,065 | 6/1966 | Latham | 23/259.5 |
| 3,256,066 | 6/1966 | Higgins | 23/259.5 |
| 3,420,631 | 1/1969 | Boyd | 23/209.4 |
| 3,438,732 | 4/1969 | Morel | 423/450 |
| 3,477,816 | 11/1966 | Shepherd | 23/209.4 |
| 3,523,812 | 8/1970 | Kraus | 106/307 |
| 3,574,547 | 4/1971 | Hinson | 23/209.2 |
| 3,669,628 | 6/1972 | Latham et al. | 23/259.5 |
| 3,753,658 | 8/1973 | Henderson et al. | 23/259.5 |
| 3,761,577 | 9/1973 | Dahmen et al. | 423/450 |
| 3,887,690 | 6/1975 | West et al. | 423/456 |
| 3,984,528 | 10/1976 | Cheng et al. | 423/450 |
| 4,071,496 | 1/1978 | Kraus et al. | 423/450 |

Primary Examiner—Gregory A. Heller

[57] ABSTRACT

Carbon black having a high diphenylguanidine (DPG) value and a low pH value is produced in a reactor by separating the combustion gases into a plurality of streams by means of a perforate partition. This partition has a tubular portion or a conical portion which is surrounded by a plurality of through apertures at the downstream end. The hot combustion gases contact the make-hydrocarbon downstream of the partition. The combustion gases are introduced into the reactor upstream of the partition in a generally tangential direction for vortex flow while the make-hydrocarbon is introduced generally axially into the reactor.

5 Claims, 2 Drawing Figures

METHOD FOR PRODUCING A HIGH DPG CARBON BLACK

This application is a divisional of copending application Ser. No. 118,720, filed Feb. 5, 1980, now U.S. Pat. No. 4,320,090, which is a continuation-in-part of copending application Ser. No. 853,716, filed Nov. 21, 1977, now abandoned.

The present invention relates to a method and apparatus for producing carbon black having a high DPG value and a low pH value as produced in the reactor, and the resulting carbon black.

In the art of furnace black production, many apparatuses and methods are known for producing various types of carbon black. The various types and apparatus and methods for producing them are desirable in that different blacks have different properties which are useful for a variety of different end products.

One desirable property in certain types of carbon black is a low pH value. Channel blacks are generally characterized by a pH value below 7 and often about 3 or 4 whereas furnace blacks are normally characterized by a relatively higher pH value, often higher than 7, for example, about 8 or 9. The lower pH value of channel black is believed to be the result of acidic groups attached to or combined with the surface of the carbon black particle and this property is believed to impart a built-in vulcanization retarding agent which operates to prevent scorch or premature vulcanization of the rubber in which the carbon black is incorporated. Therefore, it is highly desirable to reduce the pH value of carbon black or to increase the acidity of the oil furnace carbon black in order to simulate the desirable low pH channel black.

Channel black normally has a smaller particle size than most conventional furnace black and furnace carbon blacks generally impart higher modulus values to the rubber in which these blacks are compounded than do channel blacks. It is therefore seen that both channel blacks and furnace blacks each have desirable properties which are not necessarily found in the other type.

The pH value and DPG value of carbon blacks are values determined by tests which characterize the type of carbon black produced. The amount of DPG absorbed by the carbon black is a preferred method of measuring the acidic groups attached to the carbon black particles which is an indication of the surface chemistry of the particles. The pH value of a carbon black relates to the volatile matter ($C_xO_y$ complexes) on the carbon black surface. pH measures the H+ ion concentration of a slurry of water and the carbon black. Diphenylguanidine (DPG) value is the number of microequivalents of DPG absorbed by one gram of carbon black, determined by back-titration of the benzene solution of DPG with standard methanolic HCl, using tetrabromophenylsulfonephthalein indicator. pH is measured by the testing procedure in ASTM D-1512-75. It should be pointed out that carbon black, per se, does not have a "pH" and does not have DPG present in the carbon black as produced in a reactor or the like. These properties are test values which give an indication of the type of carbon black, for example, a high DPG, low pH carbon black is a slow cure carbon black whereas a high pH, low DPG is a normal or fast cure carbon black, the pH and DPG values giving an indication as to the type of product which can be made from the particular type of carbon black or the processing properties the black has when compounded with rubber.

It is possible to increase the DPG value and lower the pH value of a carbon black to produce a "slow curing" black by treating the carbon black outside of the carbon black forming zone. This, however, is costly and requires secondary processing steps. A typical process to achieve a change in DPG and pH is by adding extraneous oxidants to the reaction zone, or by pelleting carbon black with an oxidant, such as aqueous $HNO_3$, and then drying the pellets at above about 400° F. to effect at least surface oxidation of the carbon black pelleter.

The principal objects and advantages of the present invention are: to provide an apparatus for producing a carbon black which has a high DPG and low pH value without the requirement of secondary processing steps or without the requirement for extraneous materials being added to the reactor; to provide a method for producing such a carbon black which does not require secondary processing steps to achieve the desired DPG and pH values; and to provide a carbon black product having a high DPG and low pH value.

Other objects and advantages of the present invention will become apparent from the following detailed description taken in connection with the accompanying drawings wherein are set forth by way of illustration and example certain embodiments of the present invention.

Figure 1:
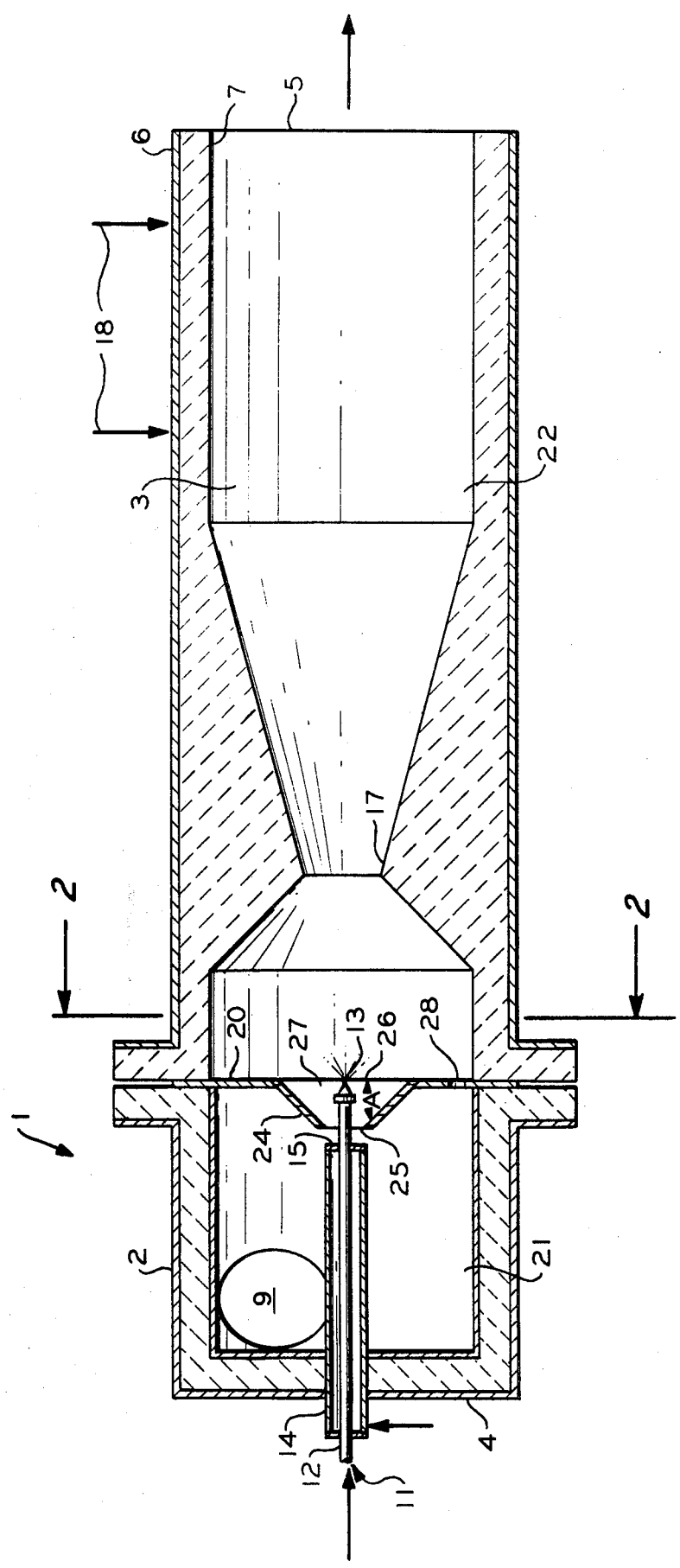
FIG. 1 is a sectional side elevational view of a carbon black reactor.
Figure 2:
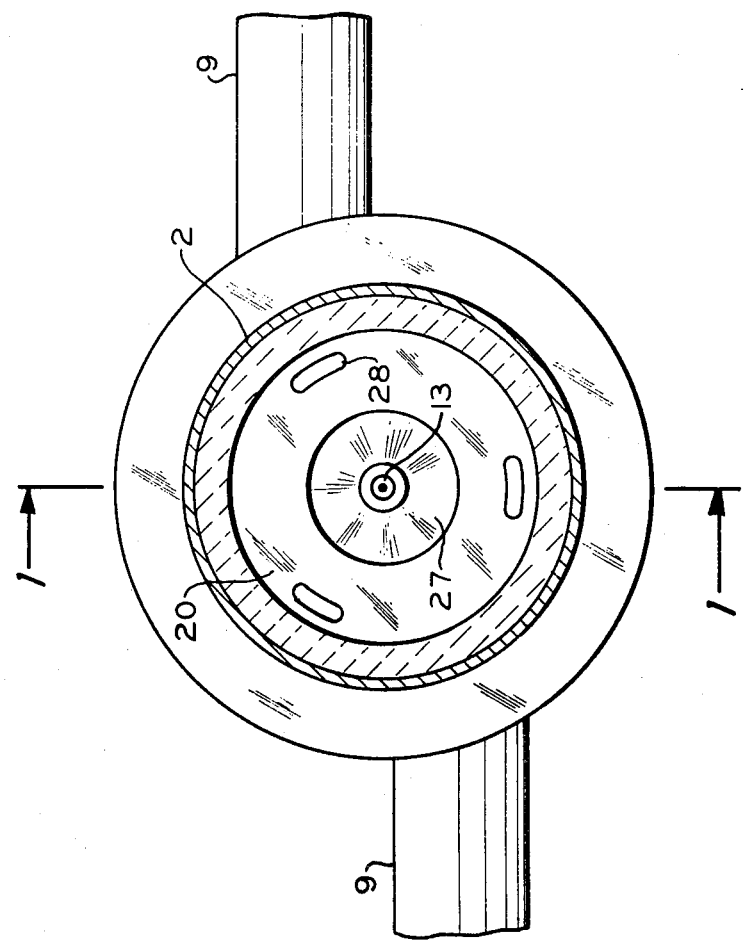
FIG. 2 is a sectional view taken along the line 2—2 of FIG. 1.

Referring more in detail to the drawings:

The reference numeral 1 designates generally a carbon black reactor which includes a housing 2 which has a hollow interior forming an elongate flow passage 3 which extends between a closed upstream end 4 and a downstream discharge end 5. The housing 2 can be of any suitable type as, for example, same can include an outer metal shell 6 which has a heat resistant refractory lining 7 therein. An inlet 9 opens into the passage 3 adjacent an upstream end thereof with the inlet 9 being preferably tangentially directed. The inlet 9 is operable for the introduction of combustion gases into an upstream end of the passage 3 and by being tangentially directed, the combustion gases will flow in a vortex manner along the passage 3. The combustion gases entering through the inlet 9 can be a mixture of a combustible gas and air which is ignited before or after the mixture enters the passage 3.

The reactor 1 is also provided with an inlet means 11 which is operable for introducing a make-hydrocarbon or feed hydrocarbon into the passage 3. When the make-hydrocarbon is contacted with the hot combustion gases at a sufficiently high temperature the make-hydrocarbon will decompose and form carbon black. Any suitable type of inlet means 11 can be provided and in the illustrated structure the inlet means 11 includes a tubular member 12 which has a discharge nozzle 13 on a downstream end thereof and is directed for discharging the make-hydrocabon in a generally axial direction into the passage 3. The tubular member 12 is connected to a source (not shown) of the make-hydrocarbon. As shown, the inlet means 11 also includes a second tubular member 14 which is in surrounding relation to the tube 12 and is operable for the introducton of cooling water around tube 12. The cooling water flowing along the outside of the tube 12 maintains the tube 12 in a cooled condition by insulating the tube 12 from the combustion gases. When cooling air is used in tube 14 for cooling tube 12 and nozzle 13, the tube 14 has an open outlet end 15 where the air is discharged therefrom preferably adjacent the nozzle 13.

A venturi 17 can also be provided in the flow passage 3 at a position preferably downstream of the nozzle 13. Also, quench fluid inlets 18 can be provided which open into the flow passage 3 at a position downstream of the venturi 17, as is known in the art. The carbon black reactor described thus far is of a type known in the art and therefore a detailed description is not necessary.

A partition 20 is positioned in the flow passage 3 and extends generally transversely across the longitudinal axis of the passage 3 dividing the passage 3 into an upstream portion 21 and a downstream portion 22 which are designated as a premix gas zone and a reaction zone, respectively. The partition 20 has a truncated tubular conical member or cylindrical member 24 positioned generally centrally thereon having opposite open ends 25 and 26 with end 25 being upstream of the end 26. The member 24 defines an axially extending flow passage 27 between the ends 25 and 26 which extends in a downstream direction preferably at an angle A of between about 30° and about 90° and more preferably about 30° to about 75°. The most preferable angle of divergence is between about 40° and about 60° because a flow passage having an angle of divergence within this range has been tested with good results. Preferably, the diameter of opening at the end 26 is between about 50 percent and about 85 percent of the diameter of the flow passage 3 at a position adjacent the downstream side of the partition 20. There is also provided in the partition 20 at least one and preferably a plurality of through apertures 28 which extend longitudinally, relative to the flow passage 3, through the partition 20. The apertures 28 are positioned between the member 24 and an inner surface of the housing 2 which defines the passage 3. The total area of the apertures 28 preferably is between about 40 percent and 80 percent of the annular area defined by the open end 25 and the tube 14. The annular area defined by the open end 25 and the tube 14 is preferably between about 3% and about 100%, more preferably between about 5% and 50%, of the area of the open end 26. The diameter of the open end 25 is between about 15% and about 100%, more preferably between about 25% and 75%, of the diameter of the open end 26. Preferably the apertures 28 are circumferentially and radially equally spaced and can be provided in sets which are positioned so as to provide a uniform flow profile of the combustion gases through the apertures 28. The apertures 28 can be the same size, different sizes or a combination thereof. Preferably, the nozzle 13 extends into and more preferably through the member 24, downstream of end 26. However, it is to be understood that the nozzle 13 can be positioned just downstream of the open end 25. The partition 20 not only serves the function of dividing the combustion gases into a plurality of streams, but it also serves as a flame holder which helps to stabilize the combustion of the gases.

The present invention is more fully understood by a description of the operation thereof. The combustion gases by being introduced tangentially flow in a vortex manner until they reach the partition 20. The partition 20 by virtue of the apertures 28 and the passage 27 divide the combustion gases into a plurality of streams. Combustion gases are introduced into the reactor 1 in a generally tangential manner with a portion of the combustion gases preferably being ignited after they enter the passage 27 and another portion of the combustion gases being ignited after they flow through the apertures 28. A make-hydrocarbon is charged axially into the reactor 1 and is contacted with hot combustion gases for decomposing the make-hydrocarbon. The stream of hot combustion gases flowing through the member 24 flow in a downstream path and with still have a vortex flow pattern. The hot combustion gases flowing through the member 24 are the first gases to contact the make-hydrocarbon if the nozzle is positioned downstream of the end 25. The combustion gases flowing from the apertures 28 and end 25 will contact the make-hydrocarbon or the reaction mass at a position downstream of the end 25 of the cone 24. A flame is retained in the passage 27 and also at the aperture 28. It is to be noted that the hot combustion gases and make-hydrocarbon produce a carbon black containing effluent which will then flow through the venturi 17, if one is provided, after which the carbon black containing effluent will be quenched by contact with a quenching fluid such as water introduced through the inlets 18. After quenching, the carbon black is then suitably separated from the gaseous portion of the effluent, e.g., by filtration.

The carbon black produced by the above-described apparatus and method has a high DPG value and a low pH value and preferably the pH is below about 4 and more preferably below about 3.5 while the DPG value is above about 80 and more preferably above about 90. The $N_2SA$ value is above about 280 $m^2$/gm, and more preferably above about 300 $m^2$/gm; the CTAB is above about 180 $m^2$/gm, more preferably above about 200 $m^2$/gm; and the 24M4 DBP is in the range of about 100 to about 140 cc/100 gm. These properties of the carbon black are produced without the need of after treatment as is typically required for currently produced carbon blacks.

EXAMPLE

The novel carbon black of this invention was produced in a reactor having the following physical characteristics:

| | Inches | Centimeters |
|---|---|---|
| Premix Gases Zone (21): | | |
| Diameter, | 4 | 10.15 |
| Length, | 6 | 15.24 |
| Tangential Entry (9): | | |
| (Flush with end 4) | 2.375 | 6.033 |
| Diameter, | | |
| Reaction Zone (22): | | |
| Diameter, | 4 | 10.15 |
| Length, (a) | 15 | 38.10 |
| Conical Unit (24): | | |
| Diameter (25), | 1 | 2.54 |
| Diameter (26), | 3 | 7.62 |
| Length, | 1 | 2.54 |
| Angle A, | 45 degrees | 45 degrees |
| Annulus Between (25) and (14): | | |
| Area, | 0.589 in$^2$ | 3.80 cm$^2$ |
| Cooling Conduit (14): | | |
| Diameter, | 0.50 | 1.27 |
| Apertures (28) (3 ea. at 120°) (b): | | |
| Length, | 0.95 | 2.41 |
| Width, | 0.125 | 0.318 |
| Total Area of 3 Apertures | 0.356 in$^2$ | 2.30 cm$^2$ |
| Nozzle (13) Position: | | |

-continued

|  | Inches | Centimeters |
|---|---|---|
| Downstream of (26), | 2.5 | 6.35 |

(a) Length is to quench inlet 18 from downstream end of the partition 20;
(b) Centers of apertures 28 are 1.75 inches or 4.45 centimeters from the longitudinal axis of reactor and were curved on their long sides in "concentric" relationship, as shown.

The gases used to produce the hot combustion gases were a mixture of air and propane which were premixed and charged tangentially at a portion upstream of the cone and were ignited with the flames resulting at apertures 28 and in the passage 27. The tangential entry of the gases at 9 effected a swirl of the premixed gases and the flames retained on 28 and this annulus. This was about a 1.13 stoichiometric ratio of air to fuel, i.e., 13 percent excess air. Air was introduced at a rate of 7500 standard cubic feet per hour and propane was charged at a rate of 266.3 standard cubic feet per hour. The make-hydrocarbon was a "Ponca 21 oil" having a density of about 9.02 pounds per gallon, a BMCI of 125, a carbon weight percent of 90.3, a hydrogen weight percent of 7.5 and a sulfur weight percent of 1.4 The make-hydrocarbon was introduced at a rate of 32.6 pounds per hour. The temperature of the gases charged at inlet 9 to produce hot combustion gases was 80° F., and the carbon black containing effluent was quenched with water at 80° F. to a temperature of about 400° F. The produced carbon black had the following properties:

It is to be noted that the air to fuel ratio, added via inlet 9, can be from about 1:1 stoichiometric air up to about 2.5 stoichiometric air, or 10 to 150 percent excess air. The air to oil ratio can be from about 1500 to about 2500 SCF/gallon.

|  |  |
|---|---|
| $N_2SA$, $M^2/gm$.[1] | 315–334[6] |
| CTAB, $M^2/gm$.[2] | 210 |
| 24M4, DBP, cc/100/gm.[3] | 115 |
| DPG, Micro eq./gm.[4] | 94–97[6] |
| pH[5] | 3.6 |

[1] ASTM D-3037-76-(Method A).
[2] Janzen, J. and Krauss, G., Rubber Chemistry and Technology, Volume 44, page 1287 (1971).
[3] ASTM D-3493-76.
[4] Diphenylguanidine (DPG) value is the number of microequivalents of DPG absorbed by one gram of carbon black, determined by back-titration of the benzene solution of DPG with standard methanolic HCl, using tetrabromophenylsulfonephthalein indicator.
[5] ASTM D-1512-75.
[6] Varied within the stated range throughout sampling period.

It is to be understood that while I have illustrated and described certain forms of my invention, it is not to be limited to the specific form or arrangement of parts or process steps herein described and shown except to the extent that such limitations are found in the claims.

That which is claimed is:

1. A method for producing carbon black comprising:
    (a) introducing a combustible mixture of gases into a carbon black reactor in a generally tangential direction relative to a flow passage in the reactor;
    (b) flowing the combustible mixture of gases along the flow passage to a partition positioned at least partially across the flow passage;
    (c) dividing the combustible mixture of gases into a first stream and at least one second stream;
    (d) flowing the first stream along a first flow path extending from an upstream side to a downstream side of the partition, said first flow path diverging in a downstream direction;
    (e) flowing the at least one second stream along an at least one second flow path extending from the upstream side to the downstrean side of the partition, said second flow path positioned between the first flow path and an interior surface of the carbon black reactor;
    (f) combusting the combustible mixture of gases downstream of the partition to form combustion gases; and
    (g) introducing a carbonaceous feed into the combustion gases to form carbon black.

2. A method as in claim 1 wherein a plurality of second streams flow through the partition along second flow paths which are circumferentially spaced apart around the first flow path, and wherein the carbonaceous feedstock is generally axially introduced with respect to the flow passage in the reactor.

3. A method as in claim 2 wherein the first flow path diverages downstream at an angle A of between about 30° and 75°, the angle A being measured between the wall of the first flow path and a plane normal to the flow passage in the reactor.

4. A process as in claim 3 wherein the angle A of the first flow path is between about 40° and 60°, the angle A being measured between the wall of the first flow path and a plane normal to the flow passage in the reactor.

5. A process as in claim 4 wherein the first flow path is defined between the partition and an oil tube positioned for axial introduction of carbonaceous feed into the combustion gases.

* * * * *